United States Patent
Bohmer

(10) Patent No.: US 10,414,345 B2
(45) Date of Patent: *Sep. 17, 2019

(54) SYSTEM FOR TRANSPORTING CHILD STROLLER

(71) Applicant: FOURTH ROW, LLC, Austin, TX (US)

(72) Inventor: Michael Bohmer, Austin, TX (US)

(73) Assignee: Fourth Row, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,714

(22) Filed: Aug. 10, 2017

(65) Prior Publication Data

US 2018/0022288 A1   Jan. 25, 2018

Related U.S. Application Data

(63) Continuation of application No. 14/695,714, filed on Apr. 24, 2015, now Pat. No. 9,738,230.

(60) Provisional application No. 61/983,531, filed on Apr. 24, 2014.

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .... B60R 9/06; B60R 9/10; B62H 3/02; B62H 3/04; B62H 3/12
USPC ....... 224/520, 519, 924, 502, 504, 553, 535, 224/537; 414/462
See application file for complete search history.

(56) References Cited

U.S. PATENT DOCUMENTS

| | | | |
|---|---|---|---|
| 4,635,835 A | 1/1987 | Cole | |
| 5,906,386 A | 5/1999 | Baker et al. | |
| 8,075,012 B1 | 12/2011 | Perez et al. | |
| 8,113,398 B2 | 2/2012 | Sautter et al. | |
| 9,073,492 B1 | 7/2015 | Shen | |
| 2002/0008363 A1 | 1/2002 | Chadwick | |
| 2008/0230579 A1 | 9/2008 | Wang | |
| 2010/0230455 A1 | 9/2010 | Wang | |
| 2010/0320247 A1 | 12/2010 | Wang et al. | |
| 2013/0062383 A1 | 3/2013 | Jeli | |
| 2015/0367785 A1 | 12/2015 | Sanders | |

OTHER PUBLICATIONS

Wikipedia, "Latch (Hardware)," http://en.wikipedia.org/wiki/Latch, accessed Apr. 24, 2015, 6 pages.

(Continued)

*Primary Examiner* — Peter N Helvey
(74) *Attorney, Agent, or Firm* — Trop, Pruner & Hu, P.C.

(57) ABSTRACT

An embodiment includes a travel system comprising: a first arm and a second arm, the first arm including an aperture; a hub pivotally coupled to the first and second arms; a male hitch insert, coupled to the hub, configured to insert within a female hitch; a handle bar support coupled to the male hitch insert and configured to receive a handle bar of a stroller; a void, located between the first and second arms, configured to receive a wheel of the stroller; and a post configured to (a) extend from the first arm to the second arm, (b) mate with the second arm, (c) extend between support members of the wheel and secure the stroller to the system. Other embodiments are described herein.

19 Claims, 15 Drawing Sheets

(56) References Cited

OTHER PUBLICATIONS

Plumber surplus.com, "Stanley 763835—Zinc Plated(2C) Outswing Gate Latch," http://www.plumbersurplus.com/Prod/Stanley-763835-Zinc-Plated-2C-Outswing-Gate-Latch/114132/Cat/1412, accessed Apr. 24, 2015, 3 pages.

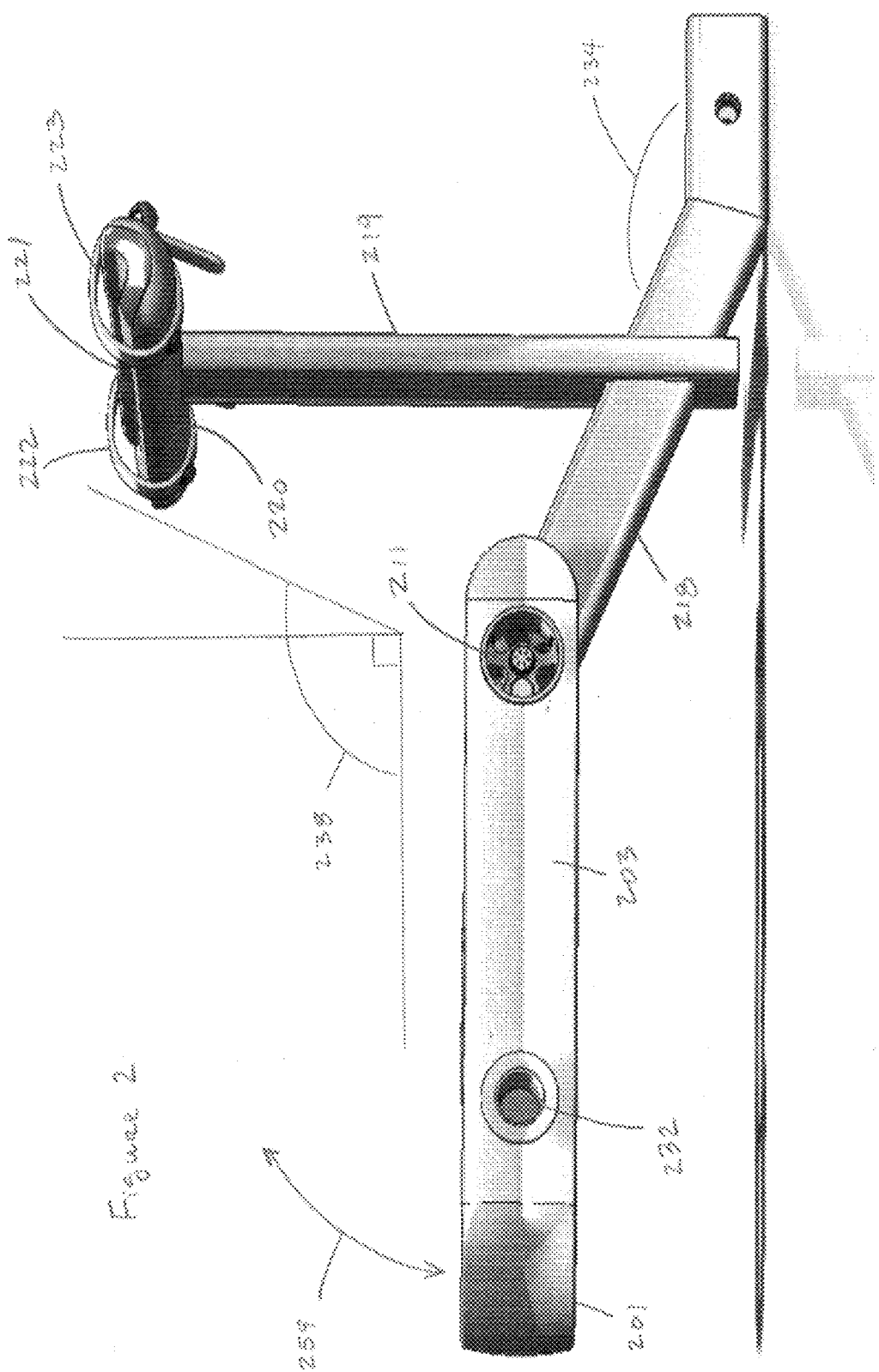

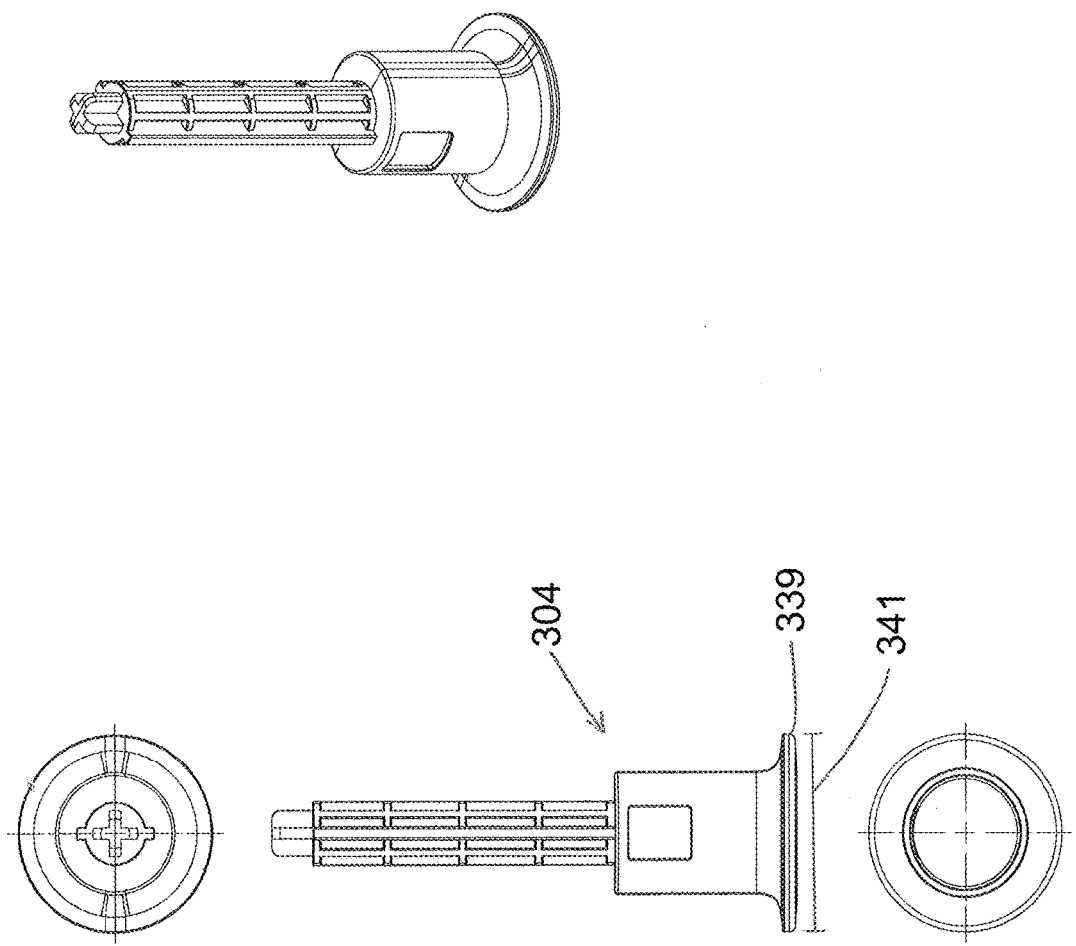

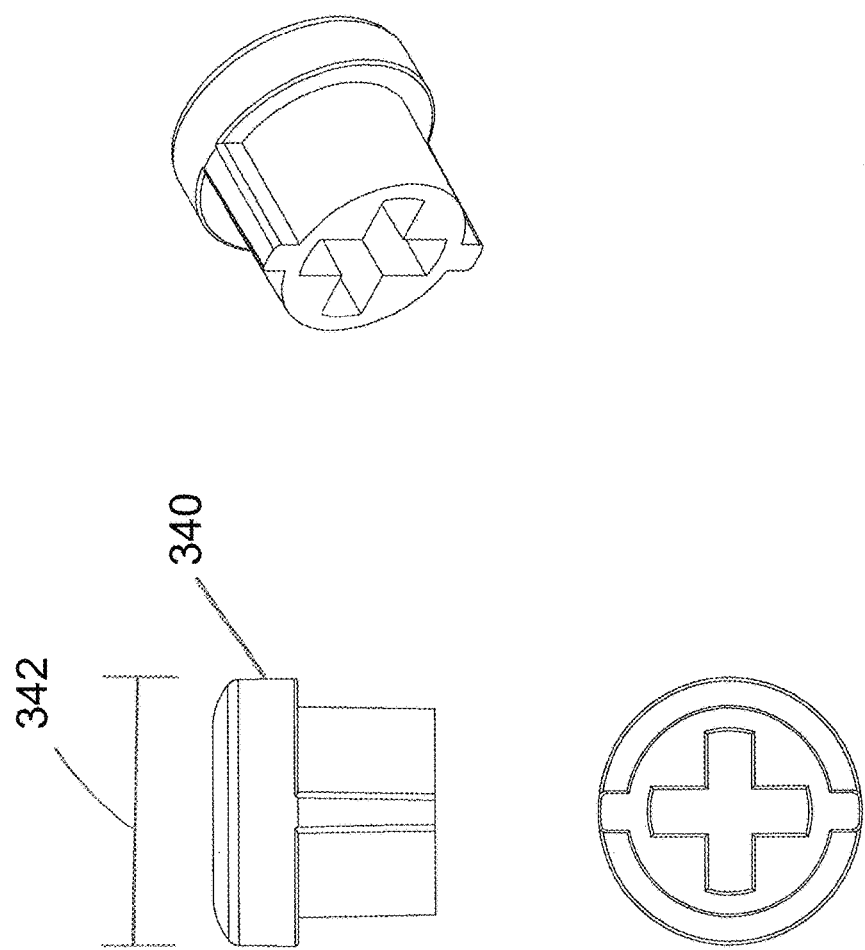

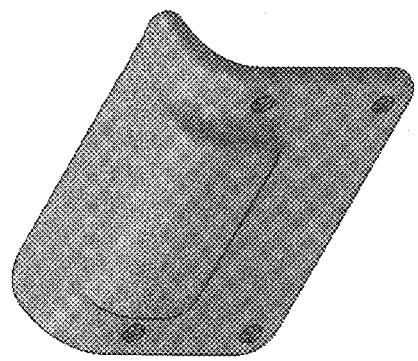
Figure 4
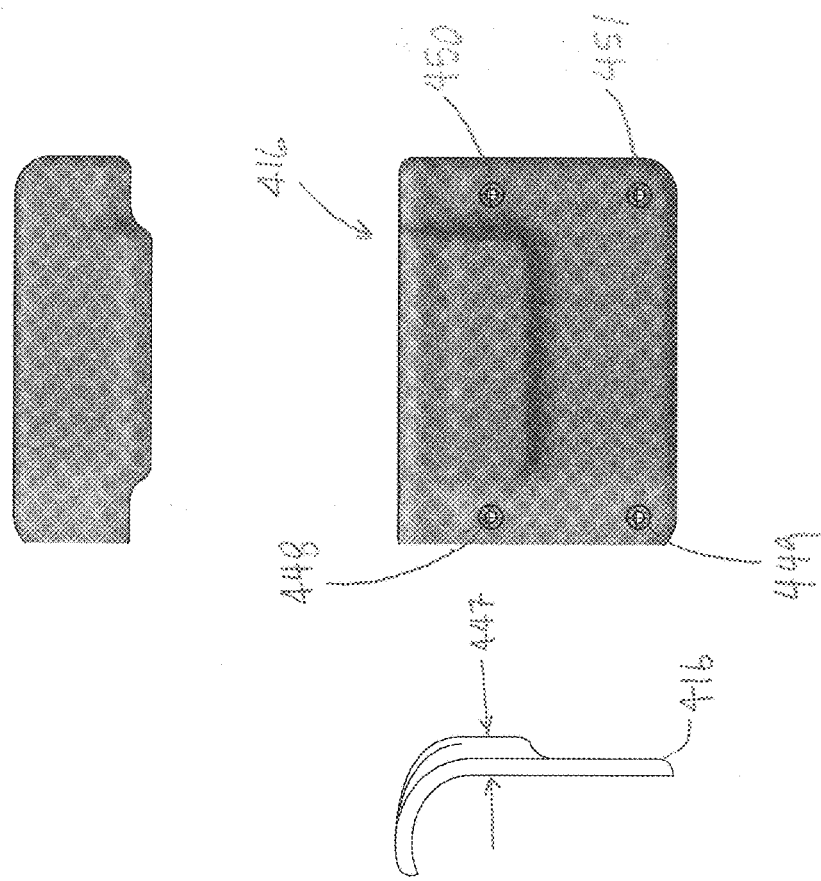

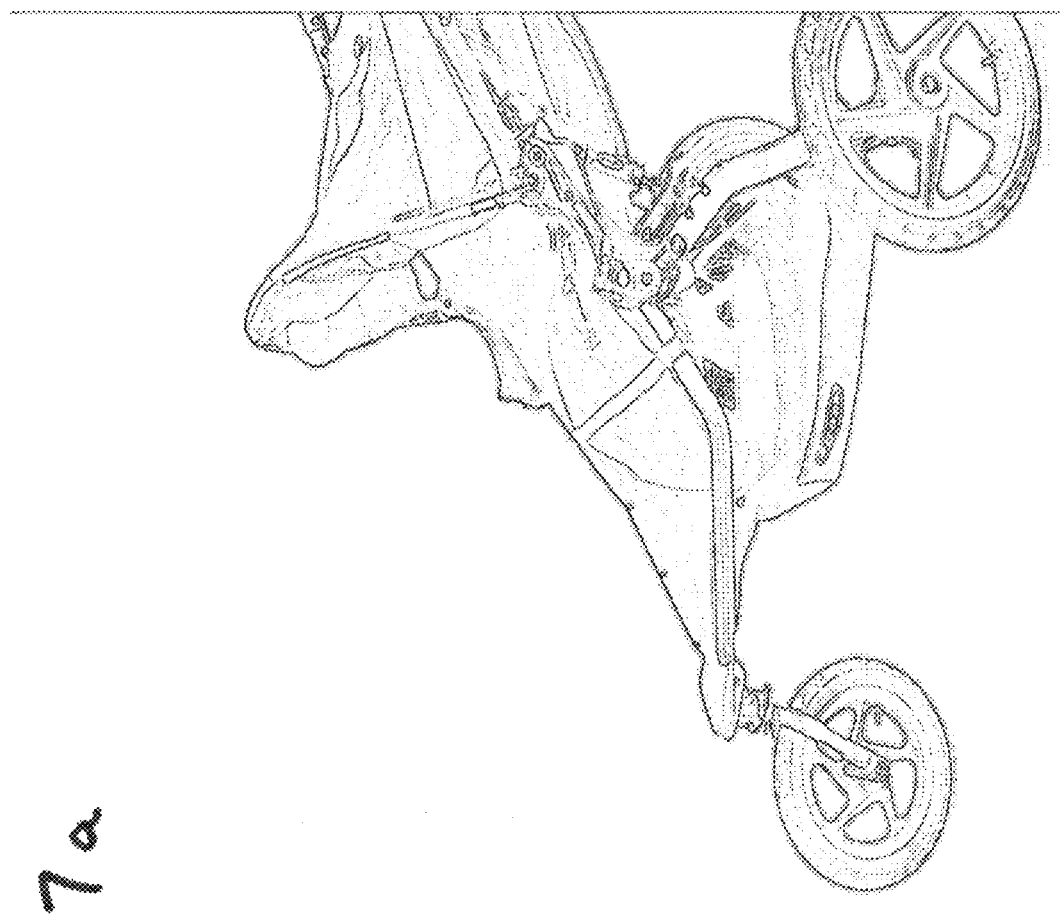
Figure 7a
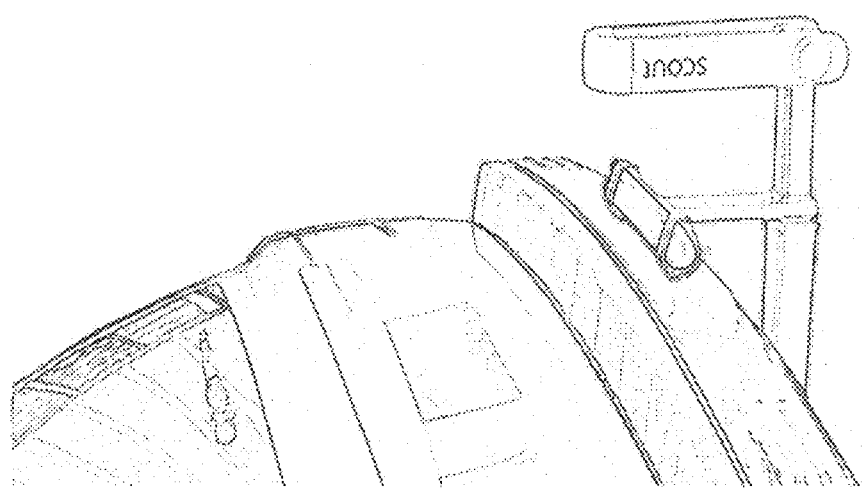

SYSTEM FOR TRANSPORTING CHILD STROLLER

This application is a continuation of U.S. patent application Ser. No. 14/695,714, filed on Apr. 24, 2015 and entitled "System for Transporting Child Stroller", which claims priority to U.S. Provisional Patent Application No. 61/983,531 filed on Apr. 24, 2014 and entitled "System for Transporting Child Stroller", the contents of which are hereby incorporated by reference.

BACKGROUND

Transporting a baby jogging stroller (and strollers in general) by automobile is difficult due to the stroller's size, weight, folding limitations, and awkward shape. The strollers do not easily fit inside automobile trunks and occupies most of the interior space of a Sport Utility Vehicle (SUV), minivan or station wagon.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures (where some may include a first number to reflect the figure number such that element 2XX is an element in FIG. 2 that is analogous to element 1XX in FIG. 1) to indicate corresponding or analogous elements.

FIG. 2 includes a side view of an embodiment of a travel system.

FIG. 3a includes top, bottom, side, and perspective views of a portion of a lock assembly in an embodiment of a travel system. FIG. 3b includes bottom, side, and perspective views of a portion of a lock assembly in an embodiment of a travel system.

FIG. 4 includes a diameter reducing plate in an embodiment of a travel system.

DETAILED DESCRIPTION

Figure 1:
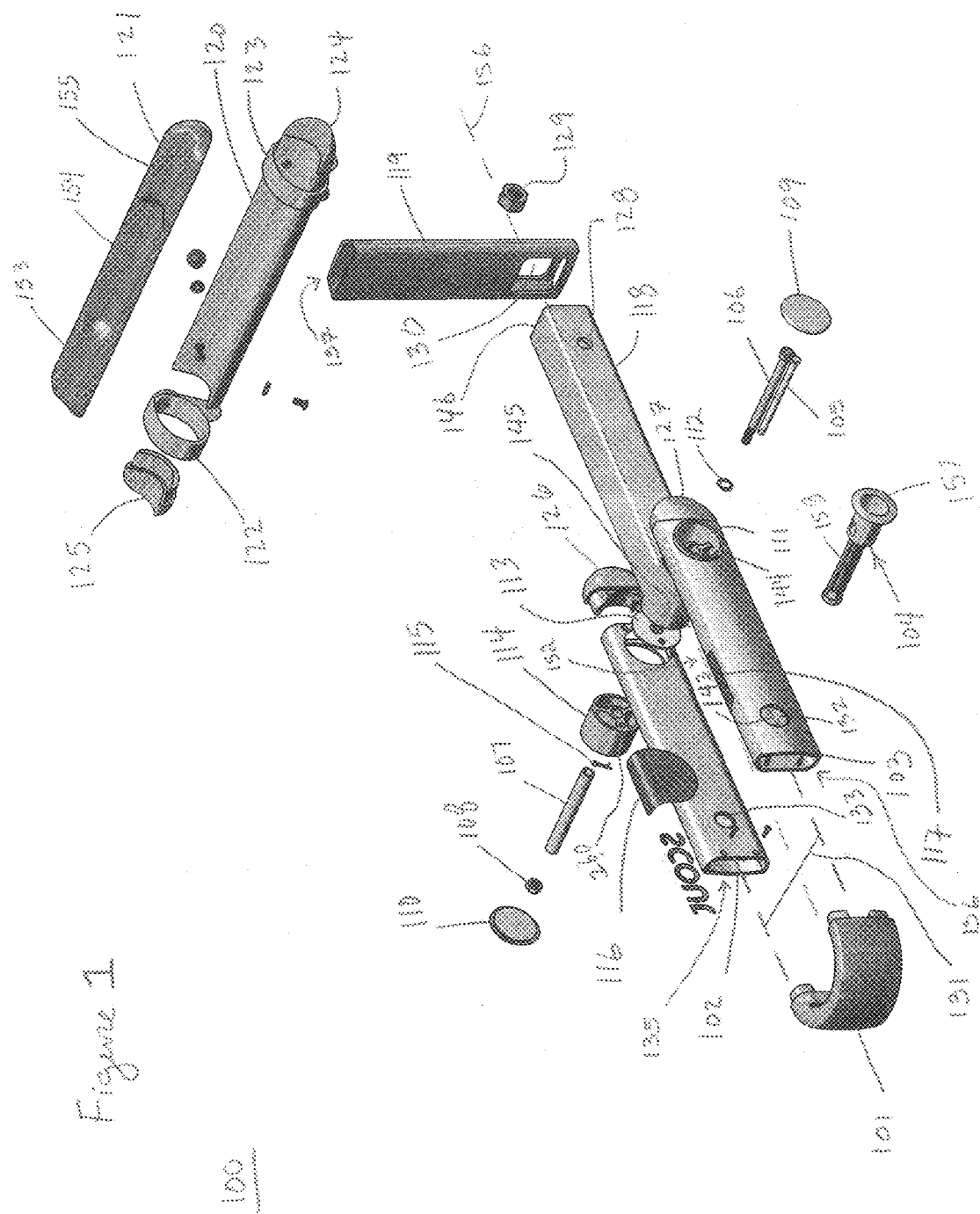
FIG. 1 includes an assembly drawing of an embodiment of a travel system.

Reference will now be made to the drawings wherein like structures may be provided with like suffix reference designations. Drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact.

Transporting baby jogging strollers by automobile is difficult due to their size, weight, folding limitations, and awkward shape. They do not easily fit inside sedan automobile trunks and occupy most of the interior space of a Sport Utility Vehicle (SUV), minivan, hatchback, or station wagon. An embodiment permits the owner to easily transport the stroller by securing it to the exterior of the vehicle via a standard hitch receiver. More specifically, an embodiment includes a mechanical device that aids in the folding and set-up of a stroller, and when attached to a vehicle hitch receiver, transports the stroller to locations previously inaccessible given the size and weight of strollers.

An embodiment, such as the embodiment of FIG. 2, serves various functions such as, for example, (1) simultaneously aids the folding and loading process of the stroller; (2) keeps baby jogging stroller a safe distance from the ground while attached to vehicle; (3) acts as pivot point for the stroller when rear access to vehicle is required; and (4) simultaneously aids in the unfolding and set-up process of a baby jogging stroller.

An embodiment has a minimal size; does not block the driver's rear view of his/her vehicle when the stroller is loaded; aids folding and unfolding of the stroller; and eliminates or reduces unassisted and unguided lifting of the jogging stroller.

An embodiment may help, for example, a young parent with small children who has need to transport a single stroller or double stroller (or triple stroller or other stroller with one or more seats for one or more occupants) in an efficient manner. His or her vehicle may be a SUV or minivan with a 2" female hitch receiver (standard or aftermarket equipped) about 12" or more from the ground. However, other embodiments may provide clearances of 5, 7, 9, 11, 14, 15 or more inches from the ground. Other embodiments are for station wagons and sedans and/or a 1.25" receiver or other sized receivers.

An embodiment allows for license plate viewing when the stroller is loaded and/or driver rear windshield viewing when the stroller is loaded. These two elements are not addressed by conventional transport systems.

Embodiments have various carrier positioning: attached to vehicle (automobile) and loaded with jogging stroller; attached to vehicle in non-stowed position and not loaded; and attached to vehicle in stowed positioned (and therefore not loaded).

An embodiment allows the vehicle owner to conveniently access the rear of vehicle when the stroller is or is not loaded. An embodiment allows ingress or egress of a child, animal, or the like from rear of vehicle.

An embodiment has features such as, for example, securely holds/transports single and/or double jogging strollers for a variety of differently sized strollers. An embodiment attaches to a rear of a vehicle via hitch receiver with minimal effort and without use of tools. An embodiment may also accommodate non-jogging strollers. The embodiment helps the user get the stroller from the unhelpful, unwieldy, and unbalanced folded state of either laying/sitting on the ground or in one hand balanced on a single wheel and into the stowed state—all while still managing children and the like that make an arduous storing of the stroller inadvisable/prohibitive.

An embodiment provides security for contents (e.g., lock to rack/vehicle) to prevent theft. For example, strollers may cost hundreds of dollars and are often stolen. However, the embodiment cannot be removed from the unit due to a locking assembly, thus serving as an obvious visual cue to its user to complete lock engagement.

An embodiment allows the vehicle to fit easily into a standard-sized garage with loaded carrier attached and allows access to inside of rear of vehicle (operate glass hatchback window while fully loaded, operate lift-gate while fully loaded). An embodiment allows height of loading/unloading position to be adjusted at initial set-up to accommodate different combinations of vehicle height, sloped ground, and/or operator ergonomic preferences.

An embodiment has a onetime set-up or infrequent adjustment, immobilizes contents during vehicle operation, provides for easy loading and unloading with minimal number of steps by one individual using only one hand at a time, does not come into contact with ground at any time (e.g., while vehicle enters or exists a driveway), does not allow the stroller to come in contact with ground at any time once the stroller is loaded for travel, does not allow the stroller to protrude beyond side of vehicle, does not protrude into parking lot aisles while loaded, and does not move relative to vehicle during vehicle operation.

FIG. 1 includes an assembly drawing of an embodiment of a travel system 100. A travel system 100 comprises a first arm 103 and a second arm 102, the first arm including an aperture 132. System 100 includes a hub comprising elements 111, 113, 114. The hub is pivotally coupled to the first and second arms 103, 102 and extends from the first arm to the second arm across void 152. A male hitch insert member 118, including the hub, is configured to insert within a female hitch (not shown). A riser member 119 is coupled to the male hitch insert member 118. A handle bar receptacle, including portion 123 that mates to compliant portion 121, is orthogonally coupled to the riser member. The handle bar receptacle is configured to receive a handle bar of a stroller. The handle bar receptacle includes portions 153, 154, 155 that may have varying forms and diameters with which to conform to brake assemblies and other contours of strollers of different makes and models. Portion 121 may include a shape, material, and durometer combination designed to provide optimal resistance to prevent movement of stroller (either orthogonally or parallel to long axis 156) during transport. System 100 includes void 152, located between the first and second arms 103, 102, configured to receive a wheel of the stroller (not shown). System 100 includes an assembly 104 having a lock (element 157 indicates cavity or void within which locking mechanism, not shown, resides) coupled to a post 158, the post 158 configured to extend from the first arm 103 to the second arm 102 and lockingly mate with the second arm. The assembly includes first and second ends 339, 340 (see FIGS. 3A and 3B) each having a diameter 341, 342 greater than a maximum diameter 143 of the aperture 132 so the assembly cannot be removed from the aperture without disassembling the assembly.

In an embodiment of the travel system 100 the first arm 103, the second arm 102, and the riser 119 each have identical cross-sections 136, 135, 137.

An embodiment includes a kit having a plurality of plates, such as plates 116, 117. Plate 417 (FIG. 4) includes first apertures 448, 449, 450, 451 that cooperate with second apertures (not shown) included in the first and second arms 103, 102. The plurality of plates (not shown) may be configured to couple to the first and second arms via the first and second apertures to reduce a diameter 131 of the void 152. The diameter 131 is orthogonal to long axis 156 (which is parallel to long axes of the first and second arms). In an embodiment the plurality of plates includes differing thicknesses to reduce the diameter of the void 152 to accommodate stroller wheels of varying thicknesses. For example, set "1" could have a first thickness that barely reduces the diameter between plates 116, 117. This may provide a resistance fit to a first hub or tire of a first jogger. However, set "2" could have a thickness that more noticeably reduces the diameter between plates 116, 117 to provide a resistance fit to a second hub or tire of a second jogger that is thinner than the first hub or tire. That way a single embodiment may be able to accommodate various stroller models.

In an embodiment the riser (analogous to riser 119) includes first and second members that telescopically deploy with regard to one another (e.g., with one member sliding within the other member) to vary height of the riser to accommodate strollers of varying sizes. This telescoping mechanism may cooperate with the plate kit described above to allow a single embodiment to be able to accommodate various stroller models.

Figure 5:
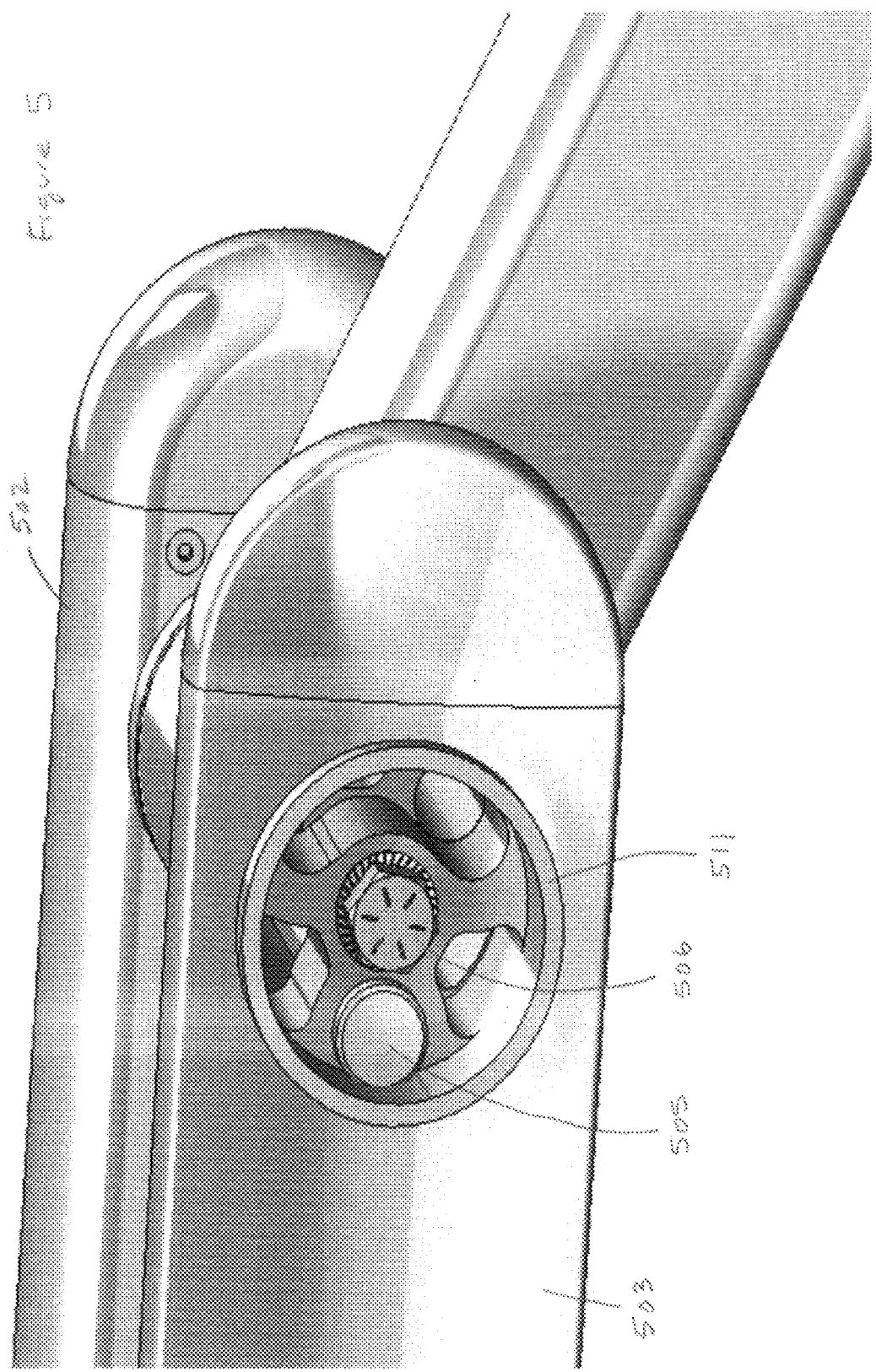
FIG. 5 includes an embodiment of a hub and detent pin in an embodiment of a travel system.

An embodiment includes a nylon sleeve 144 coupled to the hub (e.g., elements 111, 113, 114) to control a pivot rate at which the first and second arms pivot 259 about the hub 211. However, in another embodiment sleeve 144 is merely friction inducing (e.g., nylon, silicon, elastomer, polymer) to help, for example, arms that are folded up (when not transporting a stroller) stay up. In an embodiment the first and second arms pivot an angle 238 less than 150 degrees about the hub. However, in other embodiments angle 238 is 70, 90, 110, 130, 170 degrees or more. In an embodiment, detent pin 105 couples to the hub element 114 at aperture 160. As seen in FIG. 5, detent pin 505 couples about axis rod/bolt 506 and travels less than 150 degrees in traveling from a first surface of the hub to a second surface of the hub such that the first and second arms pivot less than 150 degrees about the hub. In other embodiments, the detent pin may simply abut one or more flanges of the male hitch insert member to arrest pivoting.

In an embodiment the riser 119 includes an aperture 130 that includes the male hitch insert member 118. In an embodiment the riser 119 is located between the first arm 103 and a first end 146 of the male hitch insert member 118. In an embodiment the riser 119 is located between first and second opposing ends 146, 145 of the male hitch insert member. In an embodiment the hub is located in the second end 145 of the male hit insert member.

Figure 6:
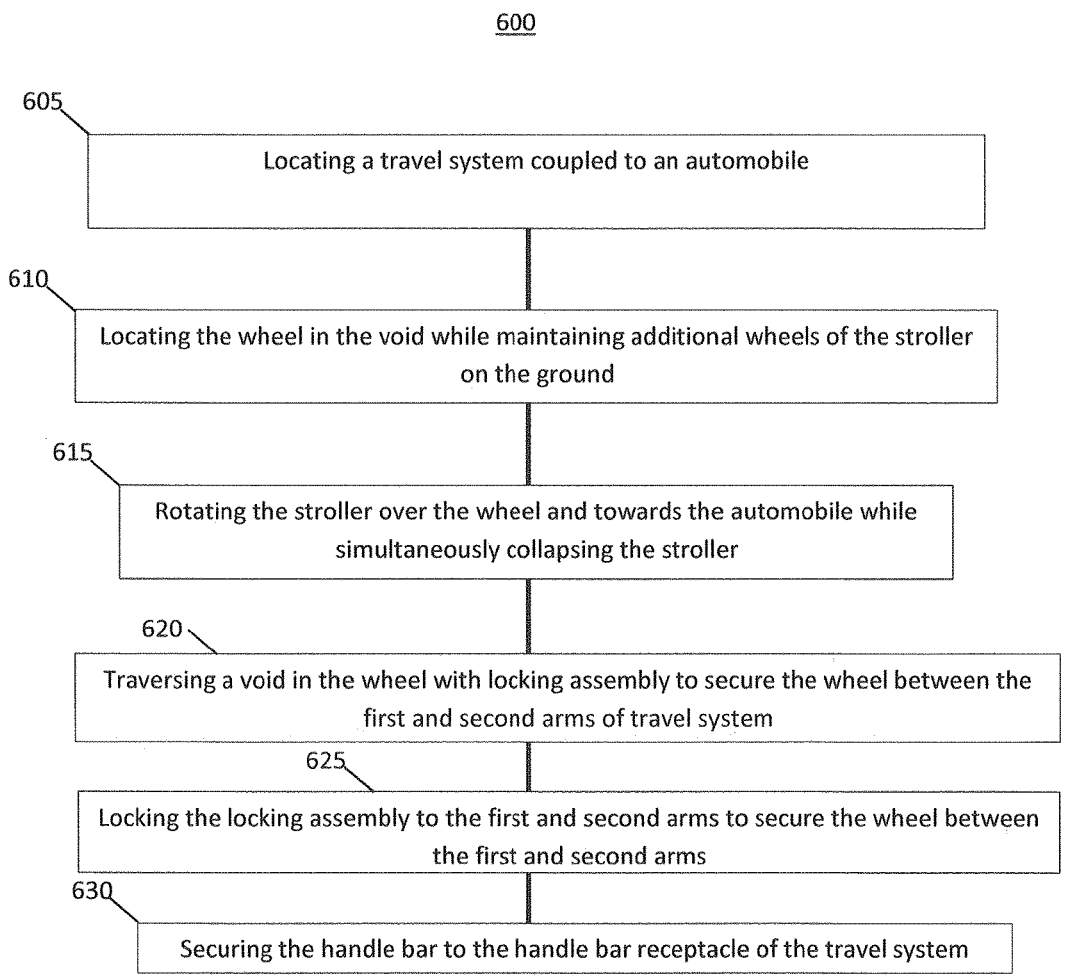
FIG. 6 includes a method of operation for an embodiment of a travel system.
Figure 7B:
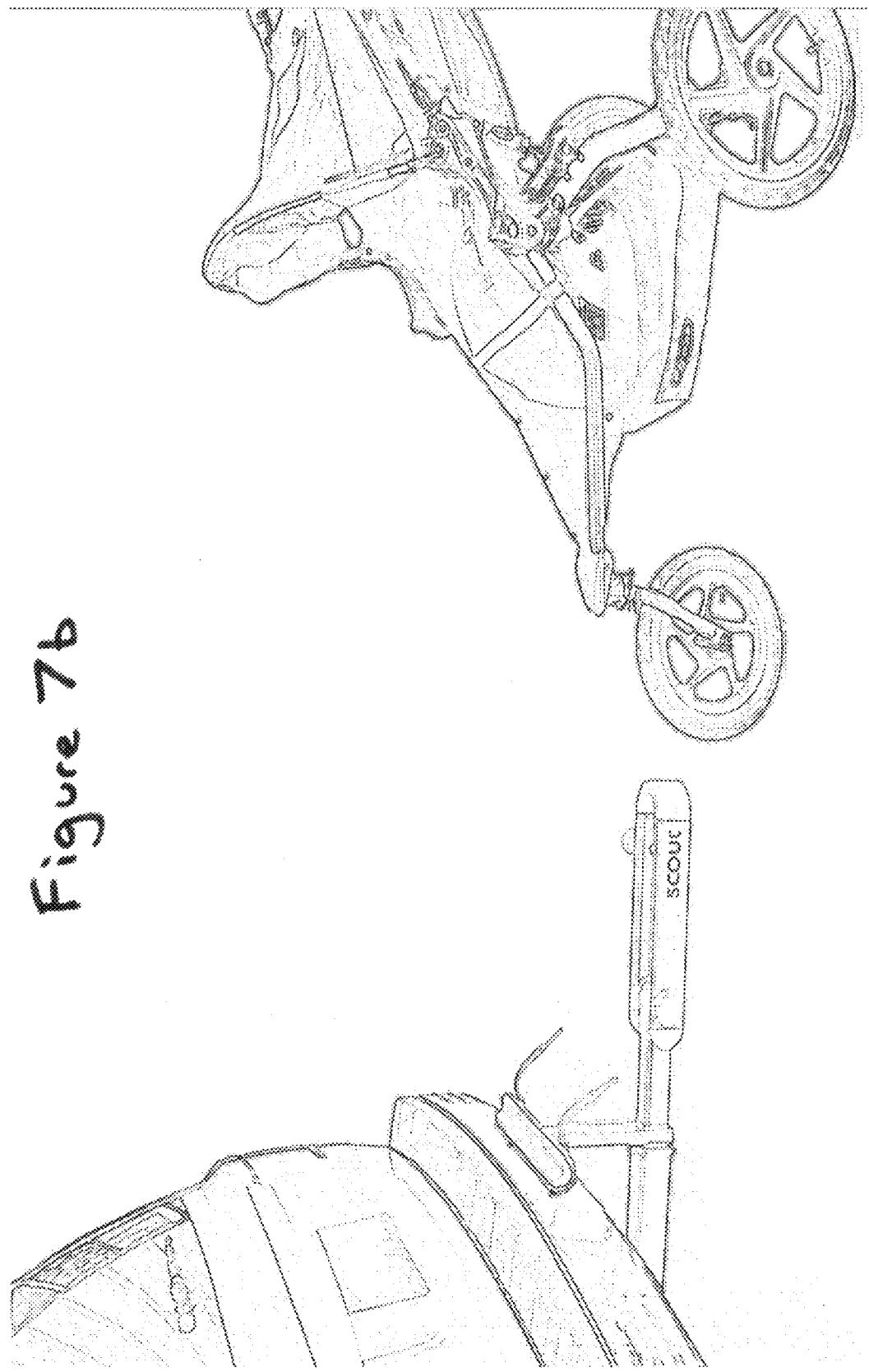
FIGS. 7a, b, c, d, e, f include a method of operation for an embodiment of a travel system.

FIG. 6 includes a method of operation for an embodiment of a travel system. Process 600 includes locating a travel system, such as system 100 of FIG. 1, coupled to an automobile (block 605). The system may comprise (a) a first arm and a second arm, the first arm including an aperture; (b) a hub, pivotally coupled to the first and second arms, extending from the first arm to the second arm; (c) a male hitch insert member, including the hub, configured to insert within a female hitch; (d) a riser member coupled to the male hitch insert member; (e) a handle bar receptacle, orthogonally coupled to the riser member, configured to receive a handle bar of a stroller; (f) a void, located between the first and second arms, configured to receive a wheel of the stroller; and (g) an assembly having a lock coupled to a post, the post configured to extend from the first arm to the second arm and lockingly mate with the second arm; wherein the assembly includes first and second ends each having a diameter greater than a maximum diameter of the aperture so the assembly cannot be removed from the aperture without disassembling the assembly. See, for example, FIG. 7a whereby the arms are pivoted up for a lower profile/footprint. In FIG. 7b the arms are pivoted downwards to receive the forward wheel of a stroller.

Figure 7C:
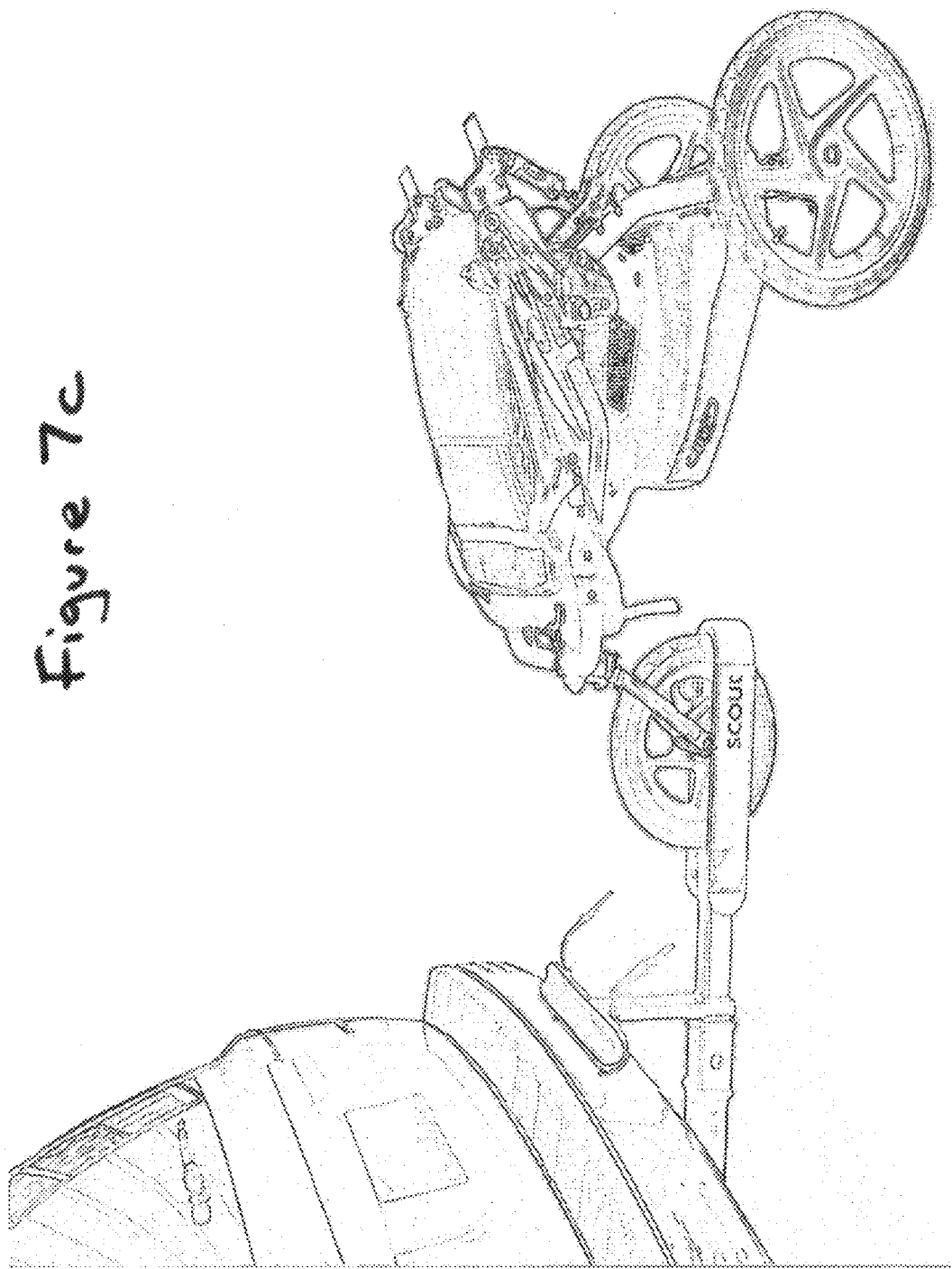
Figure 7D:
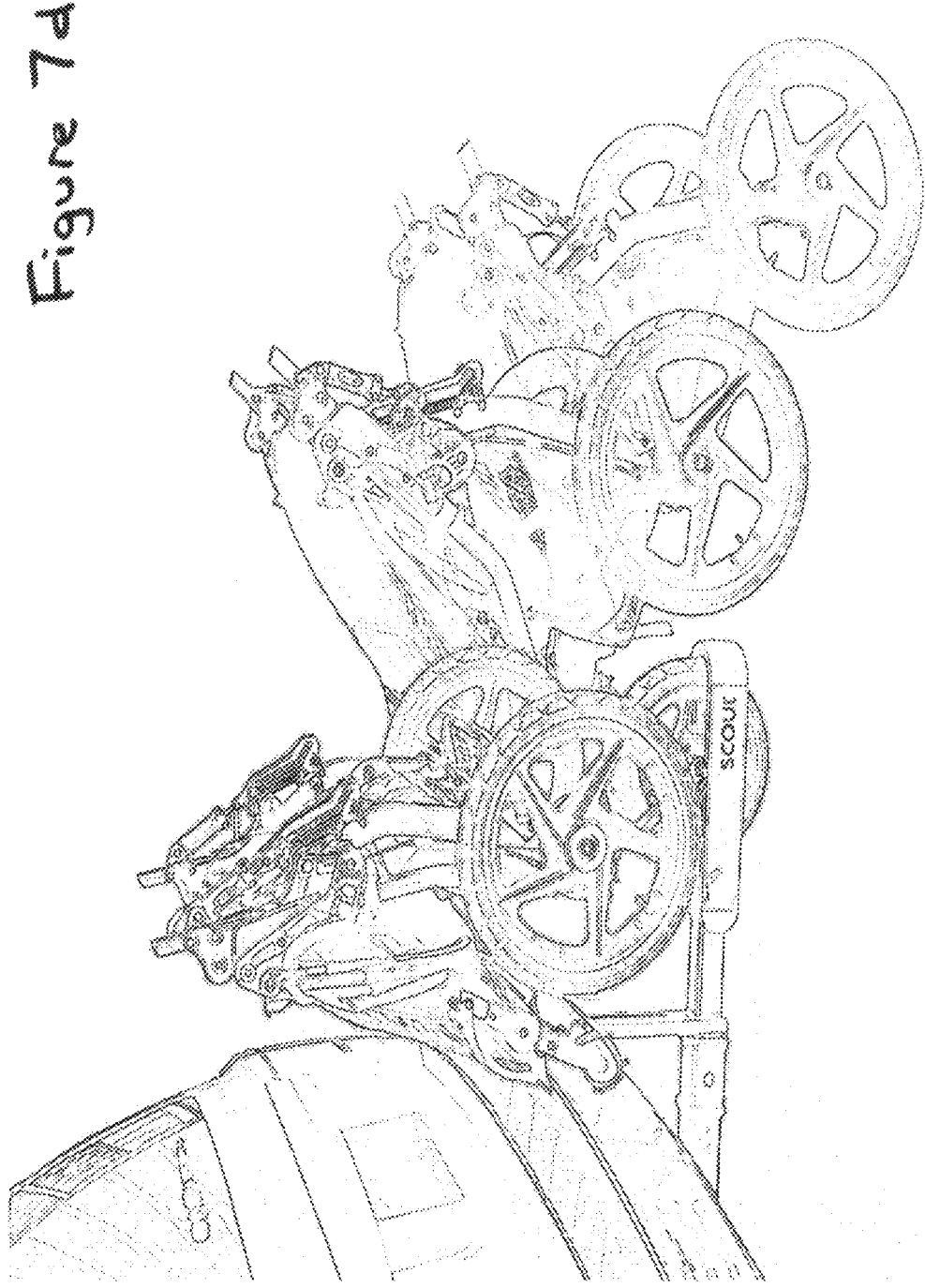
Figure 7E:
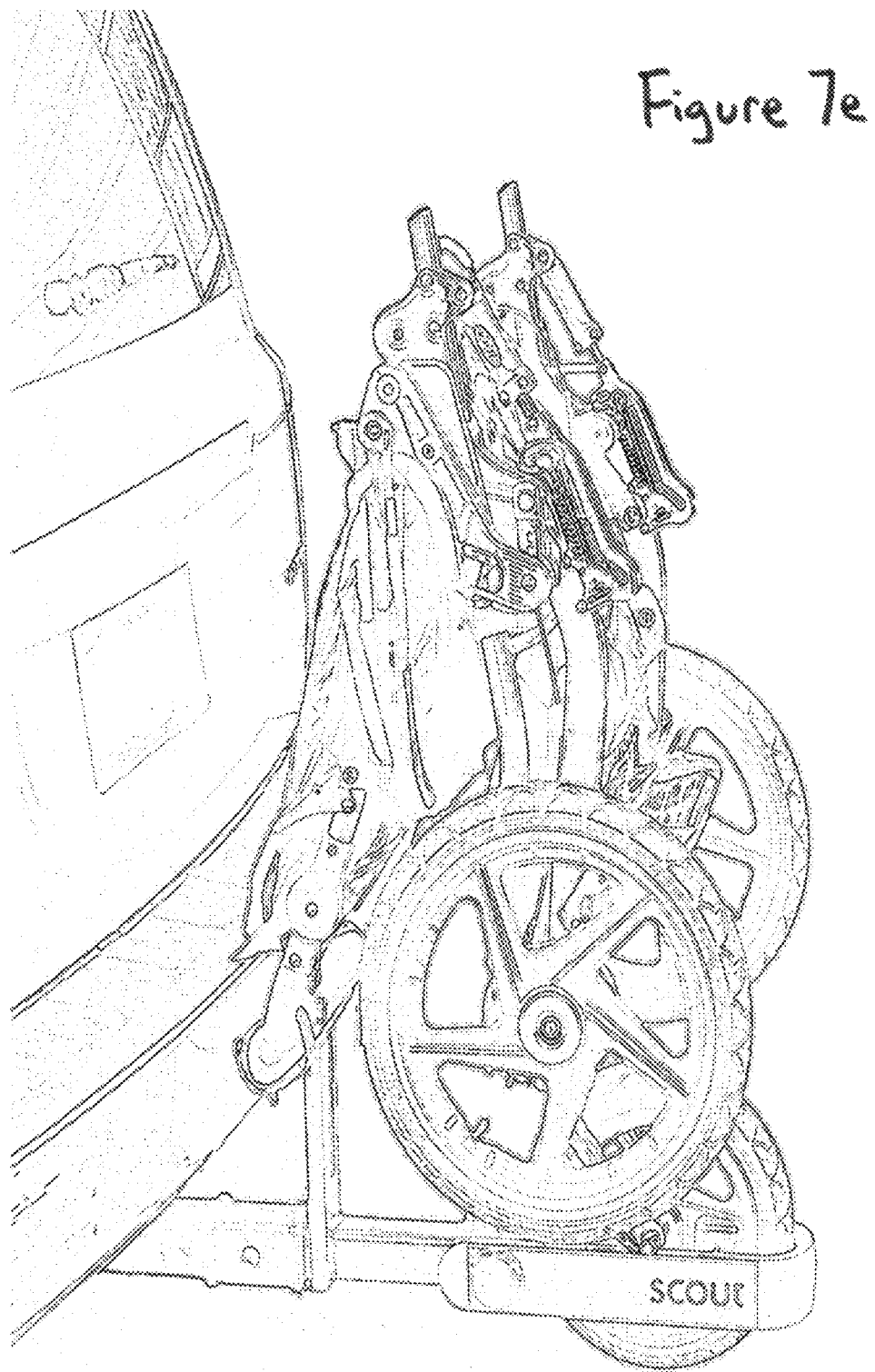
Figure 7F:
Figure 8A:
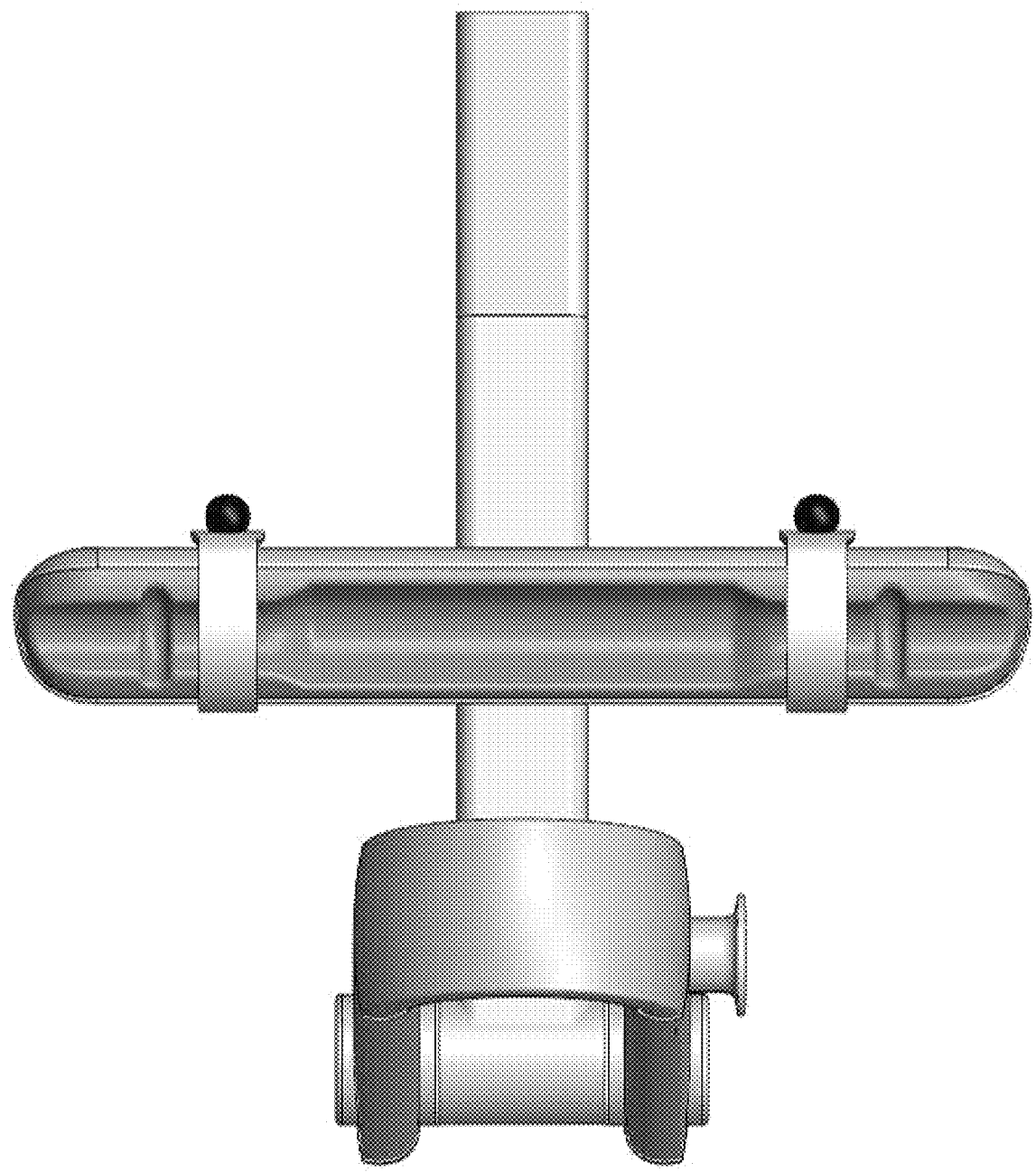
FIG. 8a includes a top view of an embodiment with arms folded (for non-stroller conveyance mode).
Figure 8B:
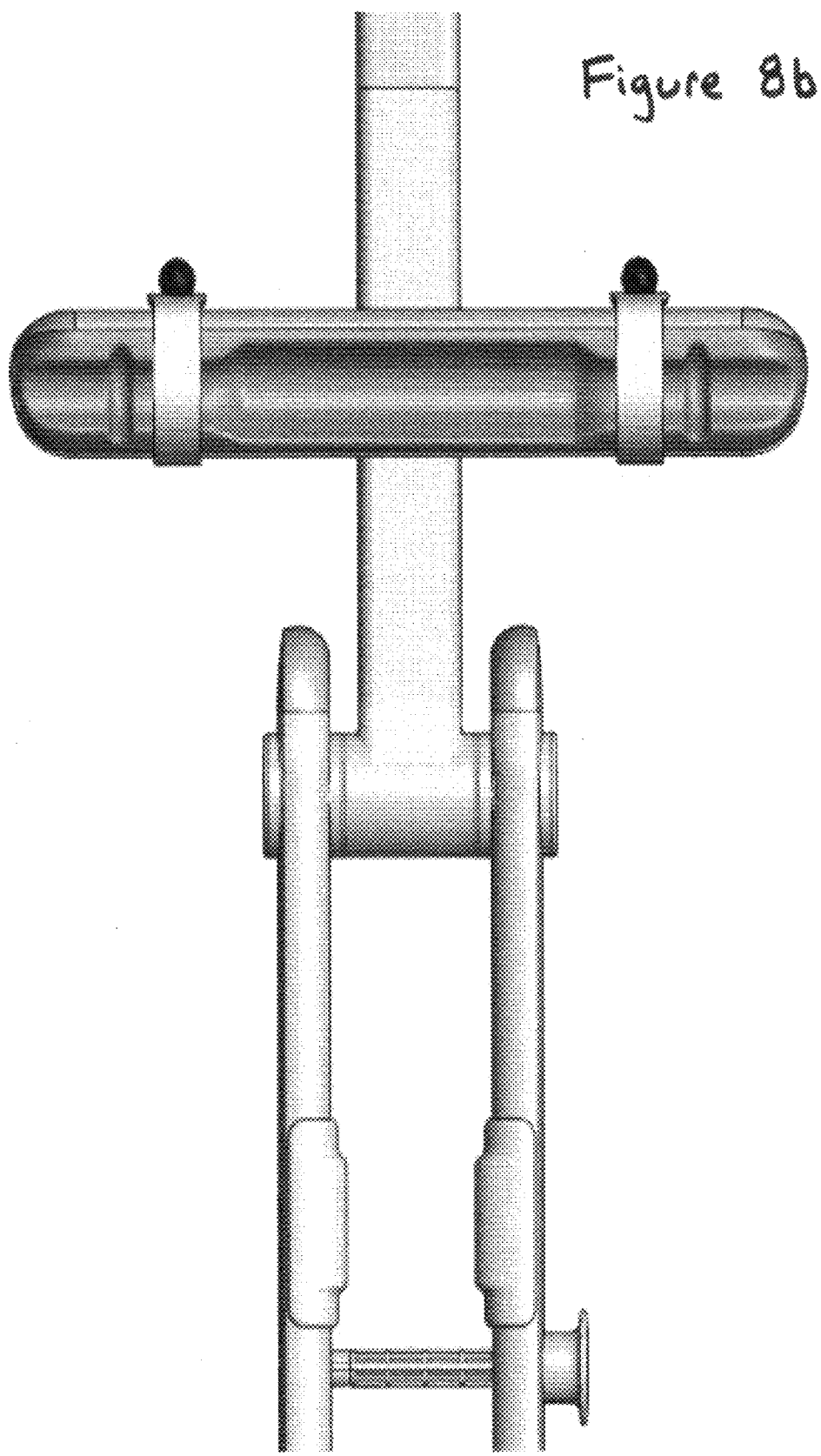
FIG. 8b includes a top view of an embodiment with arms unfolded (for stroller conveyance mode).

Process 600 then provides locating the wheel in the void while maintaining additional wheels of the stroller on the ground (block 610 and FIG. 7c). Block 615 includes rotating the stroller over the front wheel and towards the automobile while simultaneously collapsing the stroller (FIGS. 7d and 7e). Block 620 includes traversing a void in the wheel with the lock assembly to secure the wheel between the first and second arms (FIG. 7f). Block 625 includes locking the assembly to the first and second arms to secure the wheel between the first and second arms. Block 630 includes securing the handle bar to the handle bar receptacle (FIG. 7e). The sequence of blocks of FIG. 6 may vary and for example, one may secure the handle bar to the system before or after locking the wheel in place. The stroller itself may have detent mechanisms to keep the stroller from unfolding during transit. The stroller is held in place by the arms, locking assembly, and/or handle bar straps.

Referring again to FIG. 1, placement, size, material and durometer of straps 122, 123 combine to work in concert with cradle pad 121 to prevent movement of stroller during transport. Arm Bumper 101 may include an integrated handle to aid in rotation of arms 103, 102 and may include a material and durometer designed to allow for slight deformation to mitigate risk for damage to unit 100 or to other vehicles. Arm guards 116, 117 may include material and dimensions designed to establish a friction fit with a stroller wheel and therefore secure the wheel hub of a stroller thereby preventing movement during transport. Lock pin 104 and cap 340 may be glued to each other following insertion of pin 158 through hole 132 preventing assembly 104 from being removed from overall unit 100. This may serve as a visual cue to the user to engage lock pin assembly 104 in order to deter theft of a jogging stroller and prevent accidental ejection of jogging stroller from moving vehicle in the unlikely case of two simultaneous handlebar straps 122, 123 failures. An embodiment may include a lock pin support comprising a thin stiff sheet to support the lock pin 158 to be parallel with ground while in the disengaged position.

In an embodiment, arm 103 may include an aperture opposite aperture 132. Aperture 132 may be on the outside of the arm and the other aperture may align with aperture 132 but be on the inside of the arm. The insider aperture may have a smaller diameter than aperture 132 and be configured to cap 340 cannot pass therethrough. This will help the user avoid losing or misplacing locking assembly 104.

An embodiment includes a travel system comprising: a first arm and a second arm, the first arm including an aperture; a hub, pivotally coupled to the first and second arms, extending from the first arm to the second arm; a male hitch insert member, including the hub, configured to insert within a female hitch; a riser member coupled to the male hitch insert member; a handle bar receptacle, orthogonally coupled to the riser member, configured to receive a handle bar of a stroller; a void, located between the first and second arms, configured to receive a wheel of the stroller; and an assembly having a lock coupled to a cable, the cable configured to extend from the first arm to the second arm and lockingly mate with the second arm and the lock. In other words, embodiments described herein may be altered to include a simple lock and cable, with the cable (or chain) going through a stroller tire and one or more arms to secure the stroller.

As described herein, an embodiment includes a riser (analogous to riser 119) that includes first and second members that telescopically deploy with regard to one another to vary height of the riser to accommodate strollers of varying sizes. However, other embodiments provide other telescoping members. For example, a main male hitch (analogous to member 118) includes first and second members that telescopically deploy with regard to one another to vary the distance from the stroller to the automobile to accommodate strollers of varying sizes. As another example, arms 103, 102 may each include first and second members that telescopically deploy with regard to one another to vary arm length to accommodate strollers of varying sizes. For example, a common stroller may have a front wheel of 12" in diameter but another stroller may have a 16" diameter that necessitates an expansion of void 152 in a direction parallel to axis 156. An embodiment may include multiple telescoping members such as telescoping risers, male hitches, and/or arms to accommodate varying stroller sizes.

As mentioned above, an embodiment includes straps 122, 123 to secure one or more handle bars. However, another embodiment includes a latch bolt to secure a handle bar. A latch bolt may be part of a lockset and may include a spring-loaded bolt with an angled edge. When a rod (which may be curved to wrap from one end of element 120 to another end of element 120 (around the handle bar) is pushed closed, the angled edge of the latch bolt engages with the lip of a strike plate. A spring allows the bolt to retract. Once the rod (similar to a door in a gate system that uses a conventional latch bolt) is fully closed, the bolt automatically extends into the strike plate, holding the rod closed. The latch bolt is disengaged (retracted) typically when the user retracts a knob or extension on the rod, which via the lockset's mechanism, manually retracts the latch bolt, allowing the rod to open to allow access to the stroller handle (e.g., handle bar). However, in another embodiment the rod is replaced with the handle bar itself. In such an embodiment when a handle bar is pushed into the latch, the handlebar itself engages with the lip of a strike plate. A spring allows the latch to close over the handle bar. Once the handle bar (similar to a door in a gate system that uses a conventional latch bolt) is fully enclosed, the handle bar extends into the strike plate, holding the handle bar therein. The handle bar is disengaged (retracted) typically when the user retracts a knob or extension on a lever, which via the lockset's mechanism, manually retracts the latch, allowing the latch to open to allow access to the stroller handle (e.g., handle bar). For example, in an embodiment a latch assembly similar to a Stanley® 763835 Zinc Plated(2C) Outswing Gate Latch (available at http***www.plumbersurplus.com/Prod/Stanley-763835-Zinc-Plated-2C-Outswing-Gate-Latch/114132/Cat/1412) may be used. However, the bar that is received within the example latch is replaced with the handle bar itself such that placing the handle bar in the latch allows for self-latching.

Various bumpers and end pieces are provided to prevent a user from interfacing with a rough edge of, for example, an extruded metal member such as arm 103. Such end pieces include members 101, 126, 127, 125, 124, 110, 109.

Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A travel system comprising:
a first arm and a second arm;
a hub pivotally coupled to the first and second arms;
a male hitch insert, coupled to the hub, configured to insert within a female hitch;
a handle bar support configured to couple to the male hitch insert and configured to receive a handle bar of a stroller;
a void, located between the first and second arms, configured to receive a wheel of the stroller; and
a height adjustable riser configured to couple the handle bar support to the male hitch insert;
wherein (a) in a first orientation the riser has a first height between the handle bar support and the male hitch insert and in a second orientation the riser has a second height between the handle bar support and the male hitch insert, and (b) the second height is unequal to the first height.

2. The travel system of claim 1 comprising a kit, wherein:
the kit has a plurality of plates configured to couple to the first and second arms to reduce a diameter of the void; and
the diameter is orthogonal to long axes of the first and second arms.

3. The travel system of claim 1 wherein the riser includes first and second members that telescopically deploy with regard to one another to change between the first and second heights of the riser to accommodate strollers of varying sizes.

4. The travel system of claim 1 wherein the riser is located between the first arm and a first end of the male hitch insert member.

5. The travel system of claim 1 wherein the riser is located between first and second opposing ends of the male hitch insert member.

6. The travel system of claim 5 wherein the hub is located in the second end of the male hitch insert member.

7. The travel system of claim 1 comprising a latch assembly configured to secure the handle bar to the handle bar support.

8. The travel system of claim 7 wherein the latch assembly includes a spring.

9. The travel system of claim 8 wherein the latch assembly includes a spring-loaded bolt coupled to the spring.

10. The travel system of claim 8 wherein the latch assembly includes a strike plate.

11. The travel system of claim 1 comprising a self-latching latch assembly configured to secure the handle bar to handle bar support.

12. A travel system comprising:
a first arm and a second arm;
a hub pivotally coupled to the first and second arms;
a male hitch insert, coupled to the hub, configured to insert within a female hitch;
a handle bar support configured to couple to the male hitch insert and configured to receive a handle bar of a stroller;
a void, located between the first and second arms, configured to receive a wheel of the stroller; and
a self-latching latch assembly configured to secure the handle bar to the handle bar support.

13. The travel system of claim 12 wherein the latch assembly includes a spring.

14. The travel system of claim 12 wherein the latch assembly includes a spring-loaded bolt coupled to the spring.

15. The travel system of claim 12 wherein the latch assembly includes a strike plate.

16. The travel system of claim 12 comprising a kit wherein:
the kit has a plurality of plates configured to couple to the first and second arms to reduce a diameter of the void; and
the diameter is orthogonal to long axes of the first and second arms.

17. The travel system of claim 12 comprising:
a riser that couples the handle bar support to the male hitch insert;
wherein (a) in a first orientation the riser has a first height between the handle bar support and the male hitch insert and in a second orientation the riser has a second height between the handle bar support and the male hitch insert, and (b) the second height is unequal to the first height.

18. A travel system comprising:
a first arm and a second arm;
a hub pivotally coupled to the first and second arms;
a male hitch insert, coupled to the hub, configured to insert within a female hitch;
a handle bar support configured to couple to the male hitch insert and configured to receive a handle bar of a stroller;
a void, located between the first and second arms, configured to receive a wheel of the stroller; and
a riser system configured to couple the handle bar support to the male hitch insert;
wherein (a) in a first orientation the riser has a first height between the handle bar support and the male hitch insert and in a second orientation the riser has a second height between the handle bar support and the male hitch insert, and (b) the second height is unequal to the first height.

19. The travel system of claim 18 comprising a self-latching latch assembly configured to secure the handle bar to handle bar support.

* * * * *